US012565798B2

(12) United States Patent
Palmer

(10) Patent No.: US 12,565,798 B2
(45) Date of Patent: Mar. 3, 2026

(54) SEALING ASSEMBLY FOR MULTI-PANEL DOORS

(71) Applicant: Dennis Palmer, Riverton, UT (US)

(72) Inventor: Dennis Palmer, Riverton, UT (US)

( * ) Notice: Subject to any disclaimer, the term of this patent is extended or adjusted under 35 U.S.C. 154(b) by 0 days.

(21) Appl. No.: 17/956,816

(22) Filed: Sep. 29, 2022

(65) Prior Publication Data

US 2023/0160248 A1 May 25, 2023

Related U.S. Application Data

(63) Continuation-in-part of application No. 17/733,969, filed on Apr. 29, 2022, now abandoned.

(60) Provisional application No. 63/181,248, filed on Apr. 29, 2021.

(51) Int. Cl.
*E05D 15/56* (2006.01)
*E05D 15/22* (2006.01)

(52) U.S. Cl.
CPC ........ *E05D 15/22* (2013.01); *E05D 2015/225* (2013.01); *E05D 15/56* (2013.01); *E05Y 2201/686* (2013.01); *E05Y 2800/102* (2013.01); *E05Y 2800/12* (2013.01); *E05Y 2900/106* (2013.01)

(58) Field of Classification Search
CPC ........ E05D 2015/225; E05D 15/16-22; E05D 15/18; E05D 15/246; E05D 15/248; E05D 15/20; E05D 15/242; E05Y 2800/102; E05Y 2800/12; E05Y 2800/13; E05Y 2201/638; E05Y 2201/686; E05Y 2201/688; E05Y 2600/46; E05Y 2800/26; E05Y 2900/106
See application file for complete search history.

(56) References Cited

U.S. PATENT DOCUMENTS 1,921,193 A * 8/1933 Kelly ...................... E05D 15/24 160/209
2,006,228 A * 6/1935 Collins ................... E05D 15/24 16/104
2,069,665 A * 2/1937 Bouthillier ............ E05D 15/244 160/195
2,401,857 A * 6/1946 Buehner ............... E05D 15/248 160/209
4,095,641 A * 6/1978 Olson ................... E05D 15/165 160/209

(Continued)

FOREIGN PATENT DOCUMENTS

EP 3064698 A1 * 9/2016 ............. E05D 15/22

*Primary Examiner* — Catherine A Kelly
*Assistant Examiner* — Patrick B. Ponciano
(74) *Attorney, Agent, or Firm* — PETERSON IP; Brett Peterson

(57) ABSTRACT

A sealing assembly for pressing a garage door horizontally into weather stripping or a door jamb; the sealing assembly having at least one cam-stop assembly, the cam-stop assembly further having at least one cam assembly, at least one linking assembly coupling the cam-stop assembly to the cam assembly, and at least one stop brace. The garage door is sealed when a combination of cam-stop assemblies having topmost cam assemblies—that couple with stop braces and rotate counter-clockwise by exertion of torque to move the garage door forward and downward to form a snug seal with the side of the door jamb and also the bottom floor.

29 Claims, 13 Drawing Sheets

(56) References Cited

U.S. PATENT DOCUMENTS

| | | | | |
|---|---|---|---|---|
| 4,119,133 | A * | 10/1978 | Wolf | E06B 3/485<br>160/209 |
| 4,379,585 | A * | 4/1983 | Strick | B60J 5/125<br>160/195 |
| 6,928,696 | B2 * | 8/2005 | Wartman | E05D 15/24<br>16/99 |
| 7,600,551 | B2 * | 10/2009 | Lussier | E05F 15/668<br>160/40 |
| 7,861,762 | B2 * | 1/2011 | Meichtry | E05D 15/24<br>160/205 |
| 8,555,949 | B2 * | 10/2013 | Mortier | E05D 15/242<br>16/97 |
| 8,684,065 | B2 * | 4/2014 | Peterson | E05D 15/165<br>160/209 |
| 10,077,590 | B2 * | 9/2018 | Faccone | E06B 3/485 |
| 10,246,904 | B1 * | 4/2019 | White | E05B 47/0001 |
| 11,180,949 | B2 * | 11/2021 | Patock | E06B 7/2314 |
| 2008/0099163 | A1 * | 5/2008 | Bachiu | E06B 7/16<br>160/209 |
| 2017/0183897 | A1 * | 6/2017 | Bruckelmyer | E05D 15/242 |
| 2022/0307260 | A1 * | 9/2022 | Jensens | E04B 2/828 |
| 2025/0188780 | A1 * | 6/2025 | Bolden | E05D 15/242 |

* cited by examiner

SEALING ASSEMBLY FOR MULTI-PANEL DOORS

TECHNICAL FIELD

The embodiments of the present disclosure generally relate to the manufacturing and construction industries. More particularly, this disclosure relates to sealing systems for doors, such as garage doors or multi panel doors, and sealing methods which decrease air permeability and friction between doors and surfaces.

Prior application Ser. No. 17/733,969 is incorporated by reference, as well as prior application No. 63/181,248. Prior application Ser. No. 17/733,969 claims the benefit of application No. 63/181,248.

BACKGROUND

Certain structures and walls have openings which allow people, vehicles, animals, or other objects to pass through. To prevent undesirable objects from entering these openings, certain types of panels such as doors and windows are positioned within a frame constructed around the openings. An important purpose of these panels is to provide a sufficient barrier in preventing the transfer of environmental elements such as heat, noise, weather, water, and insects from one side of the panel to the other. Attempts have been made to fulfill this purpose by using various types of weather stripping between the panels and frame. For example, the weather stripping may be a strip of felt, foam, rubber, or other flexible synthetic material that provides a barrier against external weather and moisture.

The prior art panels may open and close by pivoting relatively to the frame, becoming a door or window. Alternatively, the panels may slide relative to the frame. An example of such a door is a car garage door which comprises several connected panels that move vertically. Sliding panels are advantageous for large openings because the door does not need a lot of space to swing inward or outward in order to open. However, an issue with such doors is that as time passes, friction develops between weather strips and door panels. Overtime, the increased friction degrades the integrity of the seal between the door and the frame causing the sealing system to be less efficient. In a swinging door, there may only be brief friction between the frame and panel in the initial opening movement or the final closing movement of the door. However, in sliding doors-like car garage doors—the panels often move upward along a vertical track before transferring to a horizontal track. To maintain a perfectly straight vertical track, the door constantly moves along the vertical track and rubs against the weather strip. Not only 35 does this create problems for the weather strip, but it also hinders the motor or user moving the door up and down.

One attempt to address this issue in the prior art is a system of vertical tracks that are slightly angled away from the door opening (U.S. Pat. No. 8,684,065). In order to make the door fit snugly against the door jamb when it closes, each horizontal pair of panel hinges must be different from the hinges above and the hinges below. As the hinges connect panels that are higher in placement along the track, the wheel axle is manufactured to be further and further away from the hinge point. The disadvantage is that the upward friction is only slightly decreased and there is the need for many sizes of hinges to be created for just one door.

Another attempt to address this issue in the prior art is a system using a clamshell module that allows doors to be kept away from the seal of the door jamb as they move up and down along the vertical track (PCT/CA2007/000024). While this system is an improvement on prior art, one major disadvantage is the need to use custom made hinges that are not readily available in the market, further increasing the cost to install this system.

SUMMARY

Provided herein is a system that addresses deficiencies of the art with respect to effectively creating a seal between a panel and a frame and is an improved method of allowing a door to move freely up or down along a track and also to press securely against the door jamb when the door is closed. A sealing assembly may be coupled to a garage door system, such as the garage door systems that are known in the art. The combination of the sealing assembly and the garage door system is referred to herein as the sealing system.

In certain embodiments of the present invention, a sealing system for connecting a panel to a frame comprises: a cam-stop assembly, at least one cam assembly, a stop brace, and at least one linkage connector connecting at least one cam assembly to a cam-stop assembly. In some embodiments, a sealing assembly comprises a plurality of cam stop assemblies and a plurality of stop braces such that a right stop brace and a left stop brace are installed on both sides of the garage door panels. The cam stop assembly allows vertical movement to be converted to rotational movement forward as it engages a stop brace. This forward movement causes the door to press firmly against the door jamb. The system may also, in some embodiments, include a counter-tension system which allows the door to retract into a neutral position away from the door jamb when the cam stop assembly is not engaging the stop brace.

BRIEF DESCRIPTION OF THE DRAWINGS

The drawings provided herein are not intended to be drawn to scale, instead serve to explain the principles of the invention. Each identical or nearly identical component illustrated in various drawings is represented by a common numeral. It should be noted that not every component may be labeled in each figure provided herein. Furthermore, the embodiments illustrated herein are presently preferred, it being understood, however, that the invention is not limited to the precise arrangements and instrumentalities shown, wherein.

DETAILED DESCRIPTION

Figure 1:
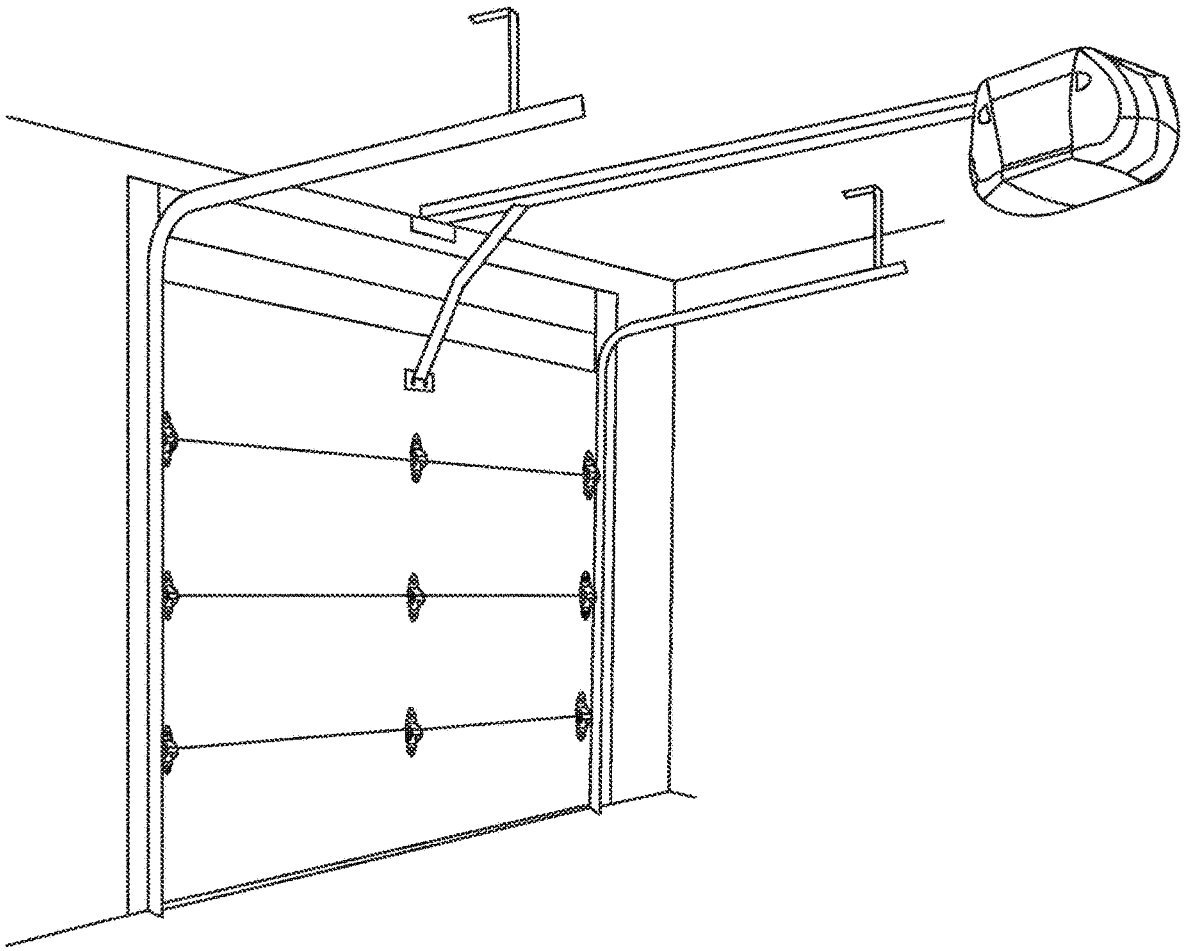
Fig. 1 (Prior Art)
FIG. 1 depicts an embodiment of a prior art garage door assembly.

In the following description, numerous details are set forth in order to provide a thorough understanding of the presented concepts. The presented concepts may be practiced without some or all of the provided details. In other instances, intricacies have not been described so as to not unnecessarily obscure the described concepts. While some concepts are illustrated in conjunction with specific embodiments, it should be noted that these embodiments are not limiting. Reference herein to "one embodiment" or "one aspect" means that one or more structure or characteristic described in connection with the embodiment or aspect is included in at least one implementation. The phrase "one embodiment" or "one aspect" throughout the specification may or may not be referring to the same embodiment or aspect.

SUMMARY OF THE INVENTION

In some aspects, the techniques described herein relate to a sealing system including: at least one guide track; a first right-side stop brace; a first right-side stop brace support coupled to the first right-side stop brace; a first left-side stop brace; a first left-side stop brace coupled attached to the first left-side stop brace, wherein a horizontal distance between the first right-side stop brace and the first left-side stop brace is at least five feet; a first right-side cam-stop assembly, further including a first right-side cam assembly attached to a first right-side stop, the first right-side stop being detachably coupled to the first right-side stop brace; and a first door panel hinge, a first right-side cam assembly being coupled to and vertically aligned with the first right-side cam-stop assembly via a first right-side linking assembly; and a first left-side cam-stop assembly, further including a first left-side cam assembly attached to a first left-side stop, the first left-side stop being detachably coupled to the first left-side stop brace; and a first left-side door panel hinge, the first left-side cam assembly being coupled to and vertically aligned with the first left-side cam-stop assembly via a first left-side linking assembly.

In some aspects, the techniques described herein relate to a sealing system, wherein the first right-side door panel hinge is attached to a garage door panel; the second right-side cam assembly is positioned below the first right-side cam-stop assembly; and the second left-side cam assembly is positioned below the second left-side cam-stop assembly.

In some aspects, the techniques described herein relate to a sealing system, further including a third right-side cam assembly coupled to and vertically aligned with a first right-side cam-stop assembly via a first right-side linking assembly; and a second left-side cam assembly coupled to and vertically aligned with a first left-side cam-stop assembly via a first left-side linking assembly.

In some aspects, the techniques described herein relate to a sealing system, further including a third right-side cam assembly coupled to and vertically aligned with a first right-side cam-stop assembly via a first right-side linking assembly coupled to a second right-side cam assembly which is couped via a second right-side linking assembly to said third right-side cam assembly.

In some aspects, the techniques described herein relate to a sealing system, further including a third left-side cam assembly coupled to and vertically aligned with a first left-side cam-stop assembly via a first left-side linking assembly coupled to a second left-side cam assembly which is couped via a second left-side linking assembly to said third left-side cam assembly.

In some aspects, the techniques described herein relate to a sealing assembly including: at least one cam-stop assembly, each of the at least one cam-stop assembly further including: a first cam assembly, having a first corner, the first corner rotatably attached to a first bolt and a first door panel hinge, the first door panel hinge having at least one flange; a second corner, the second corner attached to a roller wheel via a second bolt, wherein in some preferred embodiments a roller wheel comprises a stem, the roller wheel rotatably attached to a first guide track; and a third corner, the third corner attached to a second cam assembly via a first linking assembly, the second cam assembly located in a position relative to the first cam assembly selected from the group consisting of a position above the first cam assembly and a position below the first cam assembly.

In some aspects, the techniques described herein relate to a sealing assembly wherein the first cam assembly and the second cam assembly are each triangular in shape, include at least three pivot points, and include at least two axles.

In some aspects, the techniques described herein relate to a sealing assembly wherein the first linking assembly further includes an at least one rod; an at least one spring; an at least one rope; an at least one wire; an at least one cable; and an at least one a chain.

In some aspects, the techniques described herein relate to a sealing assembly, wherein the linking assembly further includes at least one first rod slidably disposed in a first holder of a connector; at least one tubing; at least one spring; at least one second rod disposed in a second holder, the second holder connected to the first holder; and a nut, the nut attached to the second rod.

In some aspects, the techniques described herein relate to a sealing assembly wherein the at least one tubing is either of a square or round shape.

In some aspects, the techniques described herein relate to a sealing assembly, wherein the at least one second rod is a rod selected from the group consisting of a compressible tension rod, a tension rod, a flexible rod, and a rigid rod.

In some aspects, the techniques described herein relate to a sealing assembly, wherein the at least one second rod and the nut are at least partially threaded.

In some aspects, the techniques described herein relate to a sealing assembly wherein the linking assembly further includes a tensible rod.

In some aspects, the techniques described herein relate to a sealing assembly, wherein the sealing assembly further includes a brace plate, the brace plate having a hole configured for attaching the spring to the linking assembly.

In some aspects, the techniques described herein relate to a sealing assembly, wherein the brace plate is coupled with at least one cam assembly.

In some aspects, the techniques described herein relate to a method of sealing a garage door, including: providing a sealing system including: at least one guide track; a first stop brace; a first stop brace support coupled to the first stop brace; a second stop brace; a second stop brace support coupled to the second stop brace, wherein a distance between the first stop brace and the second stop brace is at least five feet; a first cam-stop assembly, further including a first cam assembly attached to a first stop, the first stop being detachably coupled to the first stop brace; and a first door panel hinge, the first cam assembly being coupled to and vertically aligned with the first cam-stop assembly via a first linking assembly; and a second cam-stop assembly, further including a second cam assembly attached to a second stop, the second stop being coupled to the second stop brace; and a second door panel hinge, the second cam assembly being coupled to and vertically aligned with the second cam-stop assembly via a second link In some aspects, a sealing system comprising: at least one guide track; a first stop brace; a first stop brace support coupled to the first stop brace; a second stop brace; a second stop brace support coupled to the second stop brace, wherein a distance between the first stop brace and the second stop brace is at least five feet; a first cam-stop assembly, further comprising a first cam assembly attached to a first stop, the first stop being detachably coupled to the first stop brace; and a first door panel hinge, the first cam assembly being coupled to and vertically aligned with the first cam-stop assembly via a first linking assembly; and a second cam-stop assembly, further comprising a second cam assembly attached to a second stop, the second stop being detachably coupled to the second stop brace; and a second door panel hinge, the second cam assembly being coupled to and vertically aligned with the second cam-stop assembly via a second linking assembly.

In some aspects the sealing system, wherein the first door panel hinge is attached to a garage door panel; the first cam assembly is positioned below the first cam-stop assembly; and the second cam assembly is positioned below the second cam-stop assembly.

The sealing system further comprising a third cam assembly coupled to and vertically aligned with a first cam-stop assembly via a first linking assembly; and a fourth cam assembly coupled to and vertically aligned with a second cam-stop assembly via a second linking assembly.

The sealing system further comprising a fifth cam assembly coupled to and vertically aligned with a first cam-stop assembly via a first linking assembly; and a sixth cam assembly coupled to and vertically aligned with a second cam-stop assembly via a second linking assembly.

The sealing system further comprising a seventh cam assembly coupled to and vertically aligned with a first cam-stop assembly via a first linking assembly; and an eighth cam assembly coupled to and vertically aligned with a second cam-stop assembly via a second linking assembly.

A sealing assembly comprising: at least one cam-stop assembly, each of the at least one cam-stop assembly further comprising: a first cam assembly, having a first corner, the first corner rotatably attached to a first bolt and a first door panel hinge, the first door panel hinge having at least one flange; a second corner, the second corner attached to a roller wheel via a second bolt, (wherein the preferred embodiments which are disclosed in this disclosure, a roller wheel comprises a stem) the roller wheel rotatably attached to a first guide track; and a third corner, the third corner attached to a second cam assembly via a first linking assembly, the second cam assembly located in a position relative to the first cam assembly selected from the group consisting of a position above the first cam assembly and a position below the first cam assembly.

The sealing assembly wherein the first cam assembly and the second cam assembly are each triangular in shape, comprise at least three pivot points, and comprise at least two axles.

The sealing assembly wherein the first linking assembly further comprises an at least one rod; an at least one spring; an at least one rope; an at least one wire; an at least one cable; and an at least one a chain.

The sealing assembly wherein the linking assembly further comprises at least one first rod slidably disposed in a first holder of a connector; at least one tubing; at least one spring; at least one second rod disposed in a second holder, the second holder connected to the first holder; and a nut, the nut attached to the second rod.

The sealing assembly wherein the at least one tubing is either of a square or round shape.

The sealing assembly wherein the at least one second rod is a rod selected from the group consisting of a compressible tension rod, a tension rod, a flexible rod, and a rigid rod.

The sealing assembly wherein the at least one second rod and the nut are at least partially threaded.

The sealing assembly wherein the linking assembly further comprises a tensible rod.

The sealing assembly wherein the sealing assembly further comprises a brace plate, the brace plate having a hole configured for attaching the spring to the linking assembly.

The sealing assembly wherein the brace plate is coupled with at least one cam assembly.

A method of sealing a garage door, comprising: providing a sealing system comprising: at least one guide track; a first stop brace; a first stop brace support coupled to the first stop brace; a second stop brace; a second stop brace support coupled to the second stop brace, wherein a distance between the first stop brace and the second stop brace is at least five feet; a first cam-stop assembly, further comprising a first cam assembly attached to a first stop, the first stop being coupled to the first stop brace; and a first door panel hinge, the first cam assembly being coupled to and vertically aligned with the first cam-stop assembly via a first linking assembly; and a second cam-stop assembly, further comprising a second cam assembly attached to a second stop, the second stop being coupled to the second stop brace; and a second door panel hinge, the second cam assembly being coupled to and vertically aligned with the second cam-stop assembly via a second linking assembly; positioning at least one stop of at least one cam-stop assembly above an at least one stop brace; lowering the garage door and the at least one cam-stop assembly; frictionally and removably coupling the at least one stop of the at least one cam-stop assembly with the at least one stop brace, the coupling further comprising attaching the at least one stop to a first corner of a hinge of the cam-stop assembly; and exerting a torque on the at least one cam-stop assembly, wherein a second corner and a third corner of the hinge of the cam-stop assembly rotating counter-clockwise thereby pushing at least one door panel hinge to a surface.

The method of sealing a garage door comprising installing a weather strip to a garage door jamb.

A sealing system comprising: at least one guide track; a first stop brace; a first stop brace support coupled to the first stop brace; a second stop brace; a second stop brace support coupled to the second stop brace, wherein a distance between the first stop brace and the second stop brace is at least five feet; a first cam-stop assembly, further comprising a first cam assembly attached to a first stop, the first stop being coupled to the first stop brace; and a first door panel hinge, the first cam assembly being coupled to and vertically aligned with the first cam-stop assembly via a first linking assembly; and a second cam-stop assembly, further comprising a second cam assembly attached to a second stop, the second stop being coupled to the second stop brace; and a second door panel hinge, the second cam assembly being coupled to and vertically aligned with the second cam-stop assembly via a second linking assembly.

The sealing system wherein the first door panel hinge is attached to a garage door panel; the first cam assembly is positioned below the first cam-stop assembly; and the second cam assembly is positioned below the second cam-stop assembly.

The sealing system further comprising a third cam assembly coupled to and vertically aligned with a first cam-stop assembly via a first linking assembly; and a fourth cam assembly coupled to and vertically aligned with a second cam-stop assembly via a second linking assembly.

The sealing system further comprising a fifth cam assembly coupled to and vertically aligned with a first cam-stop assembly via a first linking assembly; and a sixth cam assembly coupled to and vertically aligned with a second cam-stop assembly via a second linking assembly.

The sealing system further comprising a seventh cam assembly coupled to and vertically aligned with a first cam-stop assembly via a first linking assembly; and an eighth cam assembly coupled to and vertically aligned with a second cam-stop assembly via a second linking assembly.

A sealing assembly comprising: at least one cam-stop assembly, each of the at least one cam-stop assembly further comprising: a first cam assembly, having a first corner, the first corner rotatably attached to a first bolt and a first door panel hinge, the first door panel hinge having at least one flange; a second corner, the second corner attached to a roller wheel via a second bolt, the roller wheel rotatably attached to a first guide track; and a third corner, the third corner attached to a second cam assembly via a first linking assembly, the second cam assembly located in a position relative to the first cam assembly selected from the group consisting of a position above the first cam assembly and a position below the first cam assembly.

The sealing assembly wherein the first cam assembly and the second cam assembly are each triangular in shape, comprise at least three pivot points, and comprise at least two axles.

The sealing assembly wherein the first linking assembly further comprises an at least one rod; an at least one spring; an at least one rope; an at least one wire; an at least one cable; and an at least one a chain.

The sealing assembly wherein the linking assembly further comprises at least one first rod slidably disposed in a first holder of a connector; at least one tubing; at least one spring; at least one second rod disposed in a second holder, the second holder connected to the first holder; and a nut, the nut attached to the second rod.

The sealing assembly wherein the at least one tubing is either of a square or round shape.

The sealing assembly wherein the at least one second rod is a rod selected from the group consisting of a compressible tension rod, a tension rod, a flexible rod, and a rigid rod.

The sealing assembly wherein the at least one second rod and the nut are at least partially threaded.

The sealing assembly wherein the linking assembly further comprises a tensible rod. Linkage between cam assemblies may be offset from the main panel hinge; in preferred embodiments, there may be two axle sleeves that are offset of each other, and when the axles are offset of each other than collapsible linkage may be used to connect cam assembly to an adjacent cam assembly.

The sealing assembly wherein the sealing assembly further comprises a brace plate, the brace plate having a hole configured for attaching the spring to the linking assembly.

The sealing assembly wherein the brace plate is coupled with at least one cam assembly.

A method of sealing a garage door, comprising: providing a sealing system comprising: at least one guide track; a first stop brace; a first stop brace support coupled to the first stop brace; a second stop brace; a second stop brace support coupled to the second stop brace, wherein a distance between the first stop brace and the second stop brace is at least five feet; a first cam-stop assembly, further comprising a first cam assembly attached to a first stop, the first stop being detachably coupled to the first stop brace; and a first door panel hinge, the first cam assembly being coupled to and vertically aligned with the first cam-stop assembly via a first linking assembly; and a second cam-stop assembly, further comprising a second cam assembly attached to a second stop, the second stop being detachably coupled to the second stop brace; and a second door panel hinge, the second cam assembly being coupled to and vertically aligned with the second cam-stop assembly via a second linking assembly; positioning at least one stop of at least one cam-stop assembly above an at least one stop brace; lowering the garage door and the at least one cam-stop assembly; frictionally and removably coupling the at least one stop of the at least one cam-stop assembly with the at least one stop brace, the coupling further comprising attaching the at least one stop to a first corner of a hinge of the cam-stop assembly; and exerting a torque on the at least one cam-stop assembly, wherein a second corner and a third corner of the hinge of the cam-stop assembly rotating counter-clockwise thereby pushing at least one door panel hinge to a surface.

The method of sealing a garage door further comprising installing a weather strip to a garage door jamb assembly; positioning at least one stop of at least one cam-stop assembly above an at least one stop brace; lowering the garage door and the at least one cam-stop assembly; removably coupling the at least one stop of the at least one cam-stop assembly with the at least one stop brace, the coupling further including attaching the at least one stop to a first corner of a hinge of the cam-stop assembly; and exerting a torque on the at least one cam-stop assembly, wherein a second corner and a third corner of the hinge of the cam-stop assembly rotating counter-clockwise thereby pushing at least one door panel hinge to a surface.

In some aspects, the techniques described herein relate to disclosed methods and further comprise, installing a weather strip to a garage door jamb. Multiple combinations of described aspects of the inventions are contemplated; thus, various aspects may be combined even if not explicitly described.

Structure of Cam-Stop Assemblies

Figure 2:
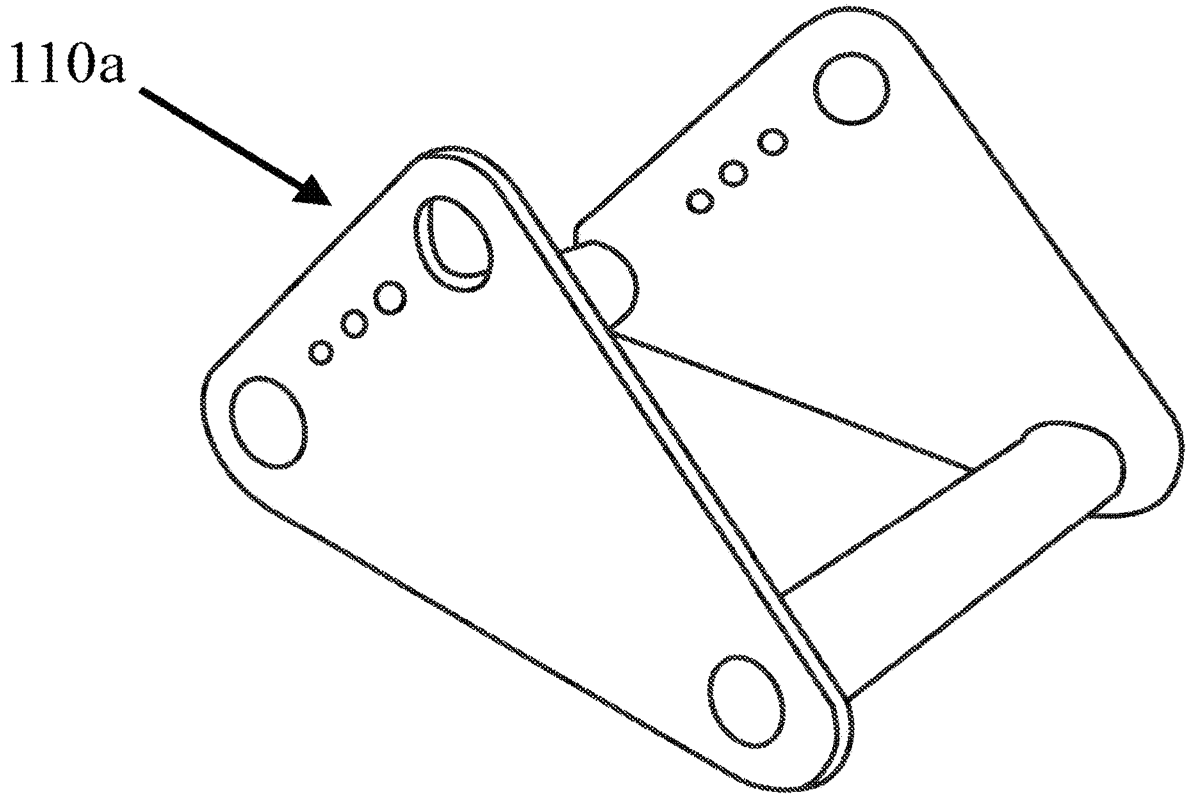
FIG. 2 depicts an angled view of some embodiments of a cam.
Figure 5:
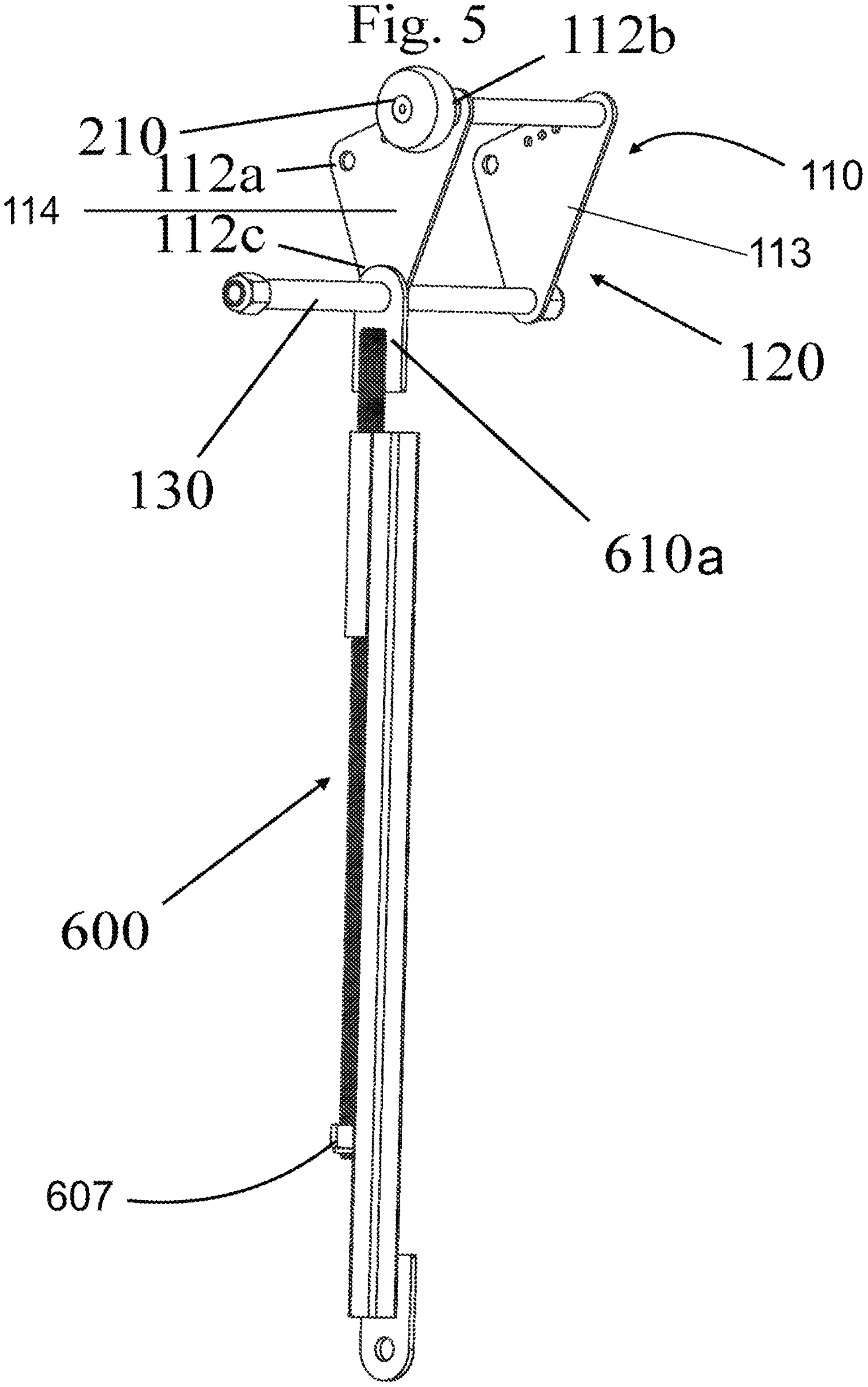
FIG. 5. depicts a front view of a cam-stop assembly.
Figure 6:
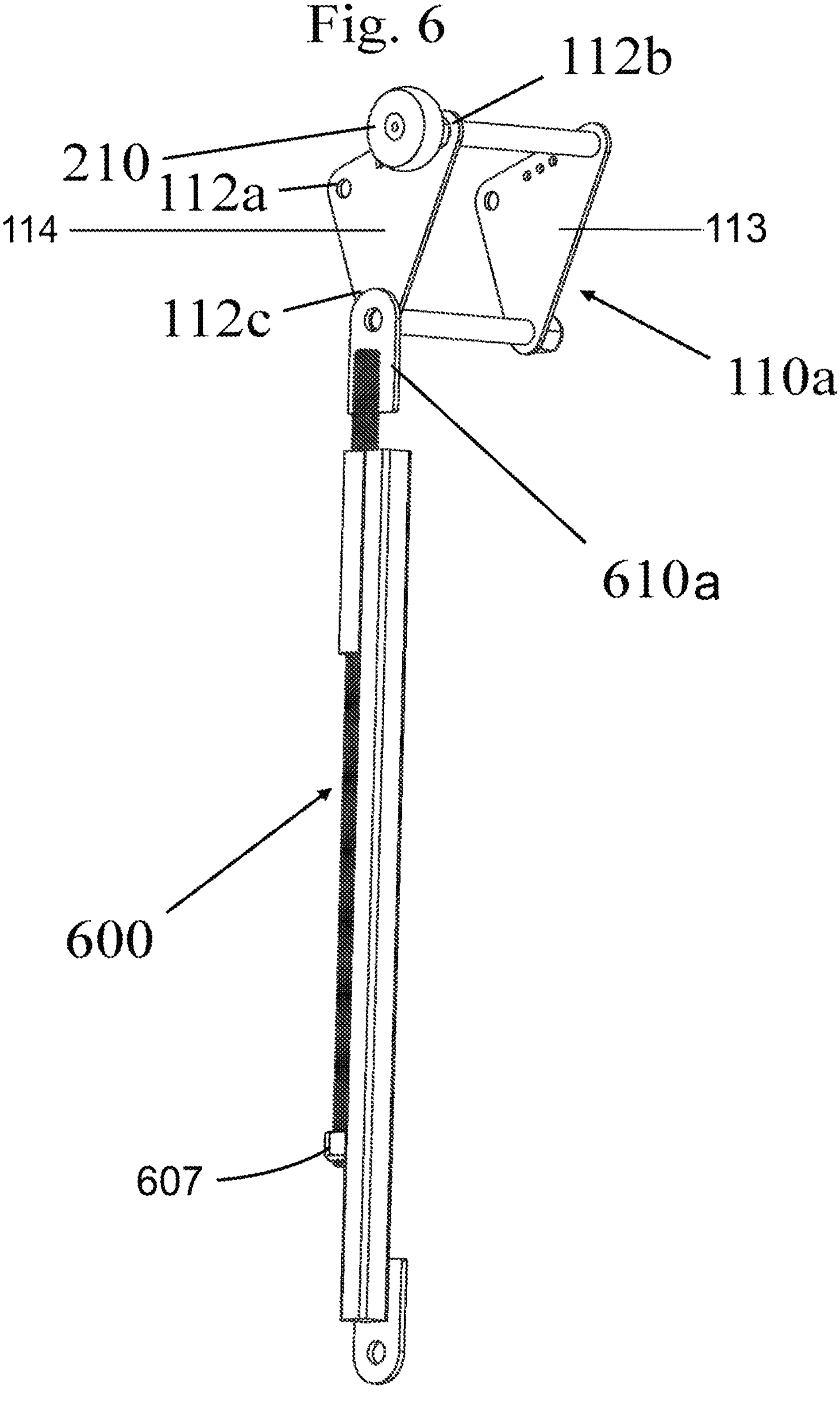
FIG. 6. depicts a front view of a cam assembly.
Figure 7A:
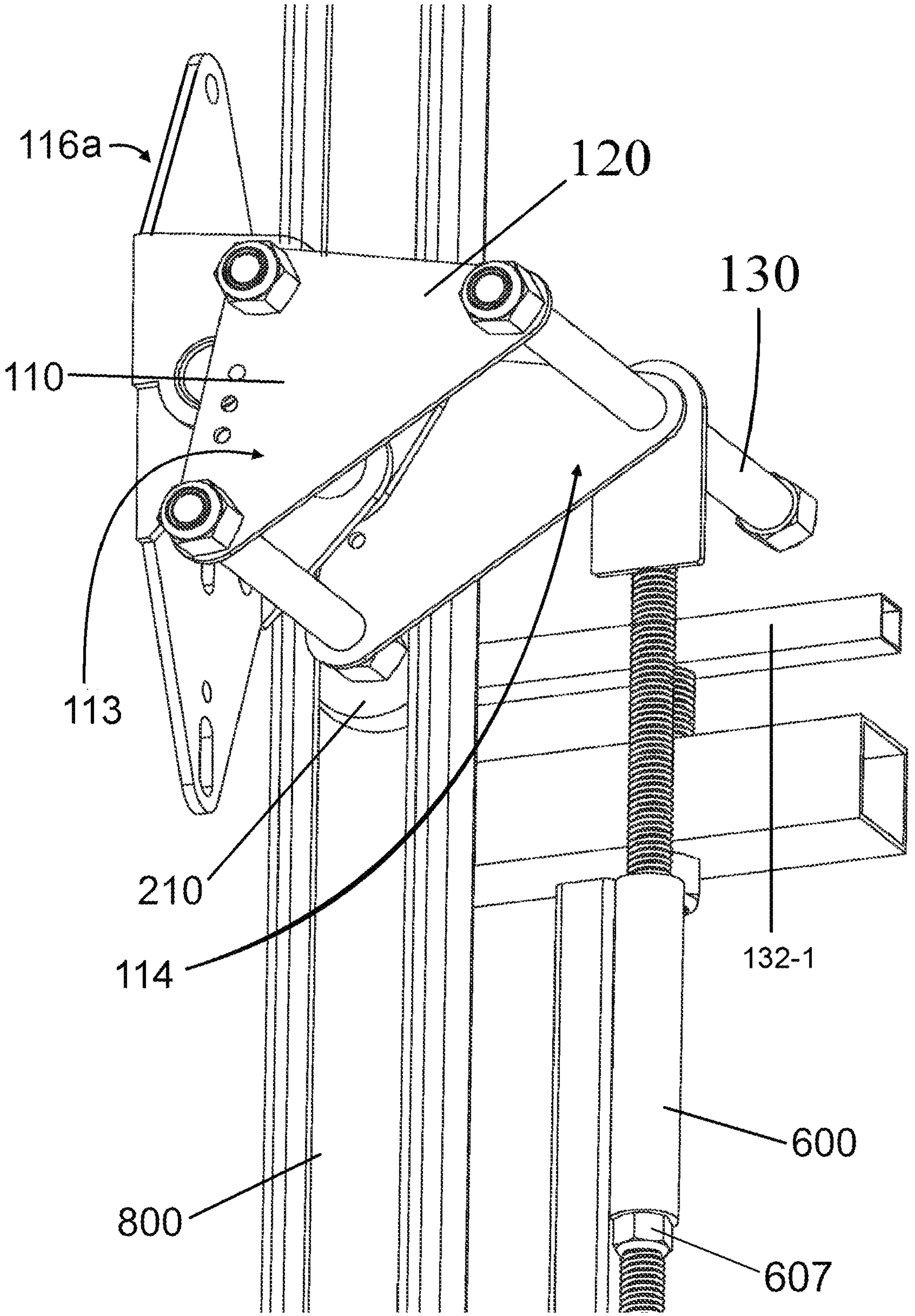
FIG. 7*a*. depicts an inner side view of a right-side cam-stop assembly in position one before it engages the stop brace.

Referring to FIG. 2, some embodiments of a cam assembly 110*a* are depicted, which are triangular, have at least three pivot points, and have at least two axles. Cam assembly 110*a* may be constructed of metal or plastic. In the preferred embodiments, a left-side component is a mirror image of a right-side component, and in some embodiments, the left-side component is identical to the right-side component, is similar to the right-side component, or is different than a right-side component. Referring to FIG. 5, a first right-side cam-stop assembly 120 may comprise a first right-side cam assembly 110 coupled to a first right-side stop 130; the first right-side stop may be an elongated appendage member. The first right-side cam assembly 110 may include a first cam plate 113 and a second cam plate 114, each comprising a first corner 112*a*, a second corner 112*b*, and a third corner 112*c*. The first corners 112*a* of the first cam plate of the first right-side cam assembly 110 may be rotatably coupled, via a bolt (115, FIG. 7*a*), to a first door panel hinge 116*a* (see FIG. 3) that may comprise a first flange 116*a*-1 and a second flange 116*a*-2. The second corner 112*b* of the first cam assembly 110*a* may be coupled, via a bolt, to a roller wheel 210 of the first cam assembly that may rotatably be coupled to the first guide rail 800. The third corner of the cam assembly 110*a* may be coupled via a first linking assembly 600, which may be a first left-side linking assembly or a first right-side linking assembly, to a second cam assembly 110*b*, which may be preferably located below first cam assembly 110*a* but may, in some embodiments, be located above first cam assembly 110*a*.

Figure 3:
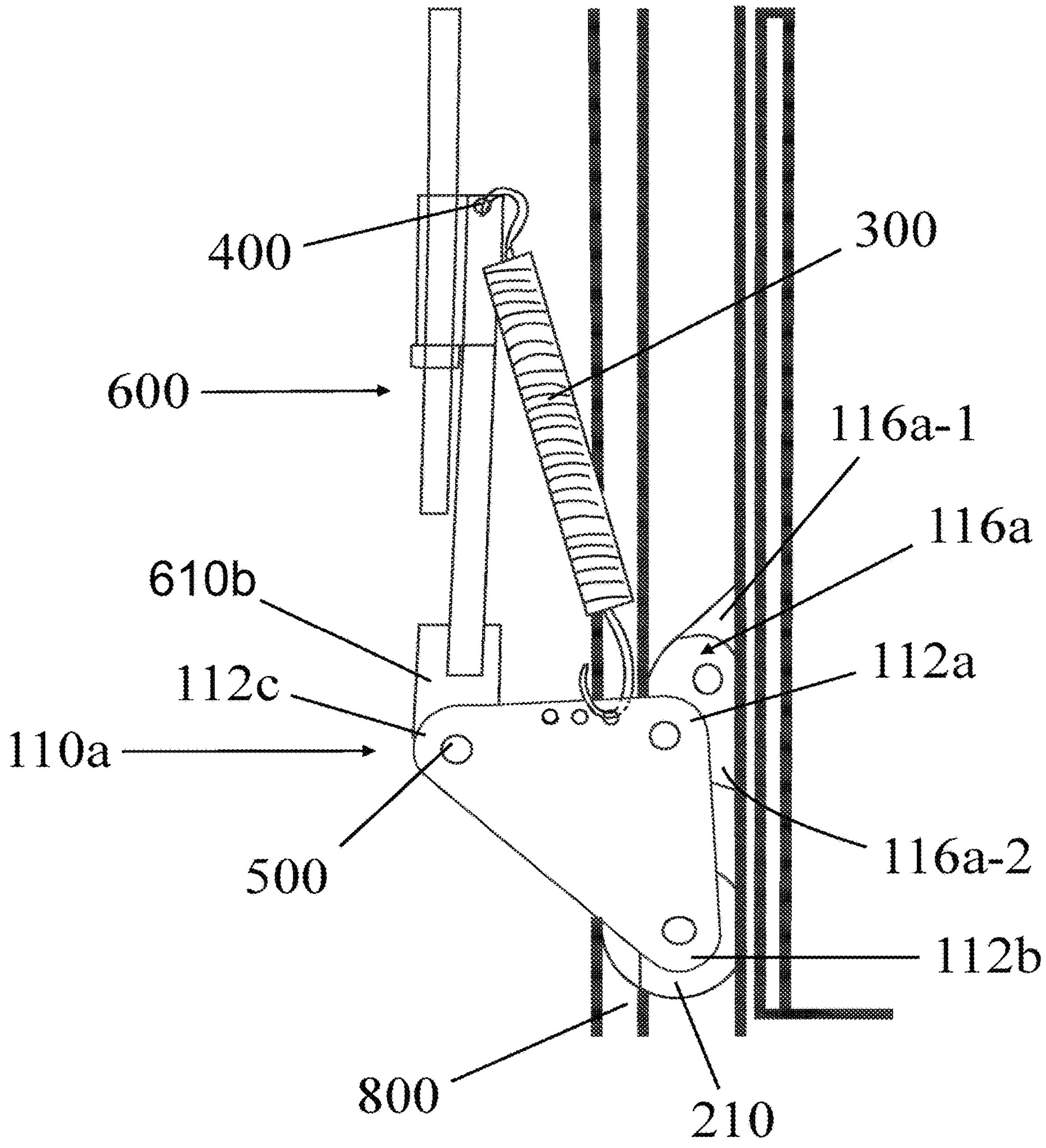
FIG. 3 depicts a side view of a counter-tension system.
Figure 4A:
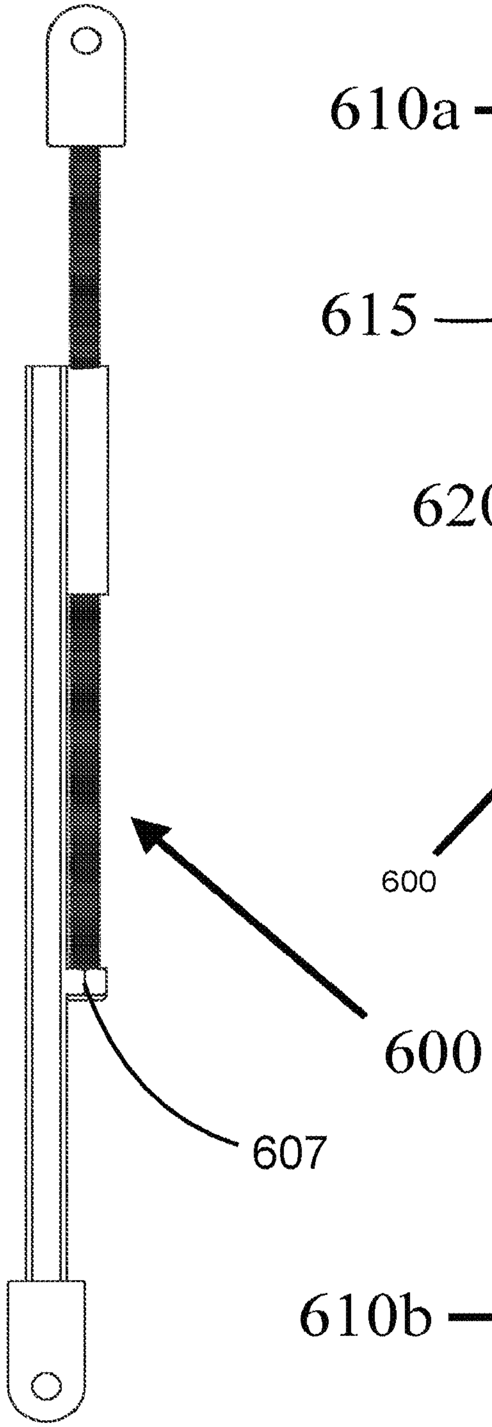
FIG. 4*a* depicts a side view of a linking assembly and FIG. 4*b* depicts a perspective view of the linking assembly.
Figure 4B:
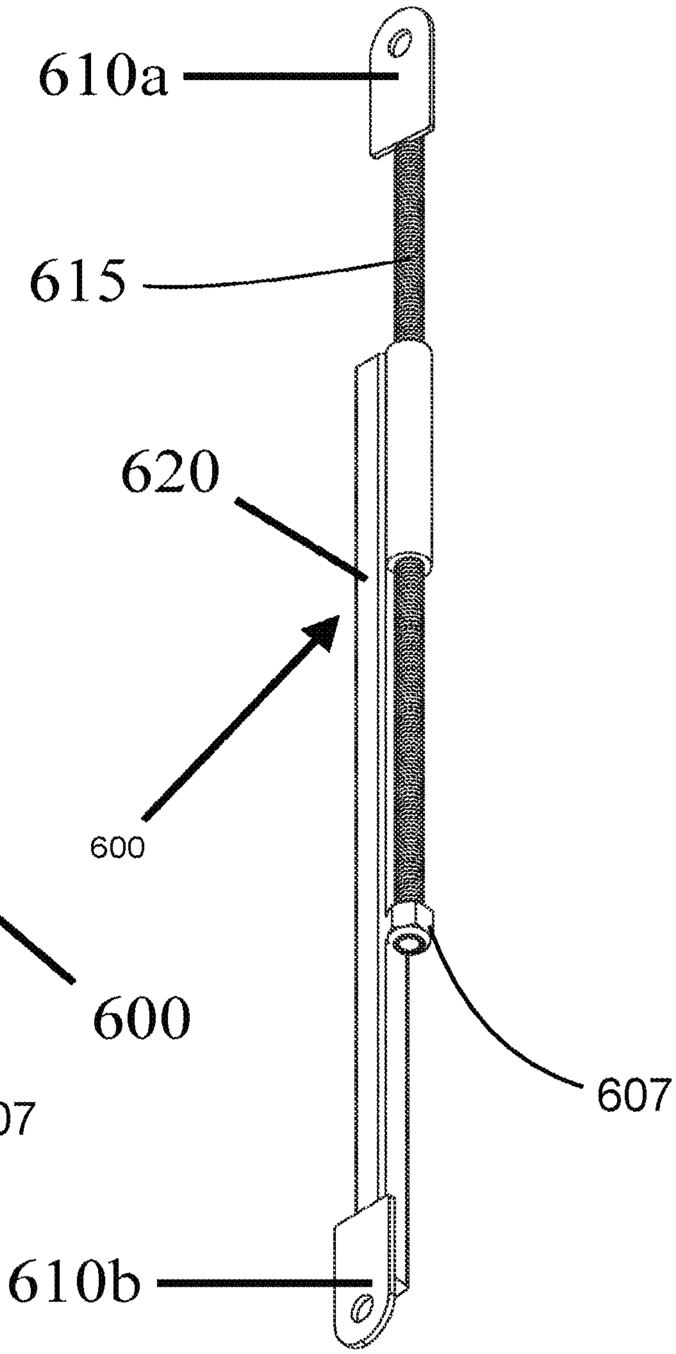
Figure 9:
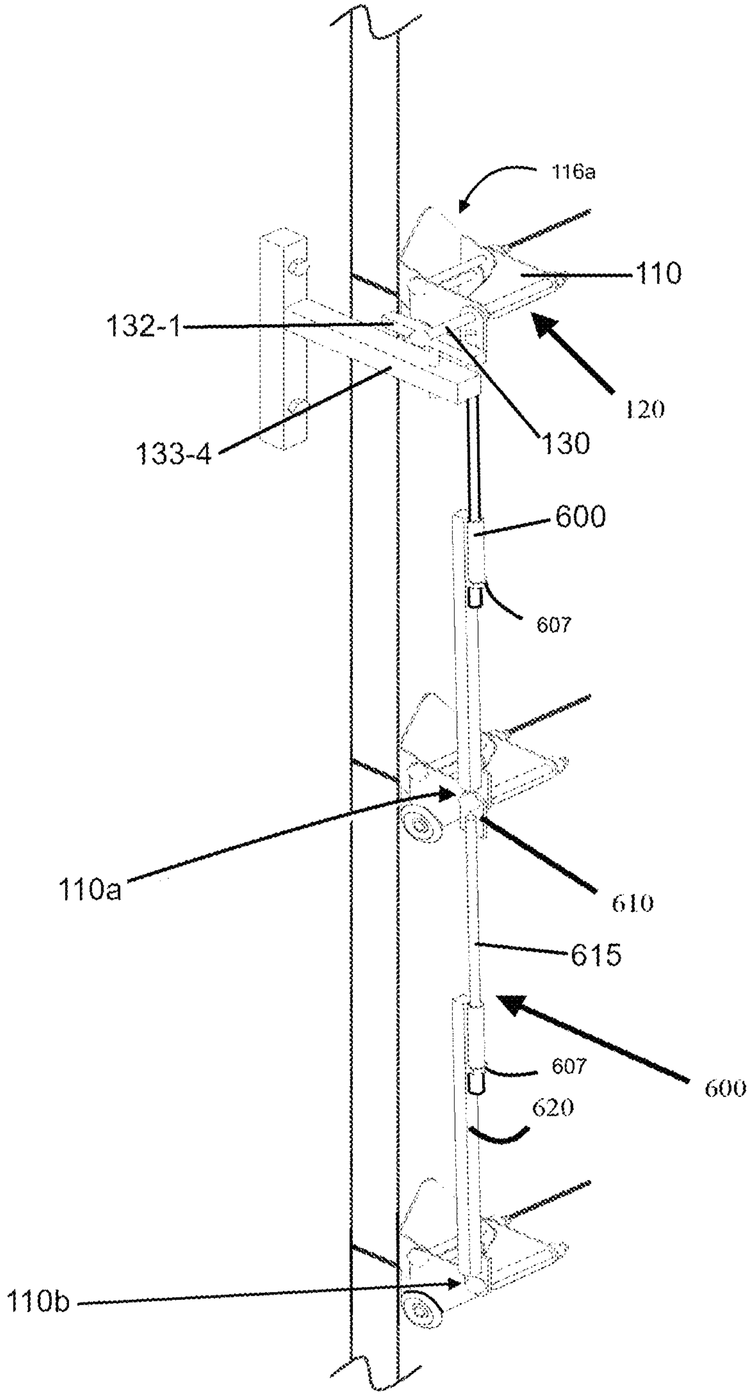
FIG. 9. depicts an isolated view of several cam assemblies linked together.

As shown in FIG. 4*a* and FIG. 4*b*, the first linking assembly 600 may include at least one of a rod, a spring, a rope, a wire, a cable, and a chain. In the preferred embodiments, linking assembly 600 may have a rod 615 that is slidably disposed within a first holder 620 of a connector, adjacent and aligned in an opposite direction of the rod when disposed in the holder 620 consisting of one or more combinations of the following: at least one length of tubing (which may be square, round, or some other shape), at least one spring, at least one rod-which may be a compressible tension rod, a tension rod, a flexible rod, or a rigid rod-disposed within a second holder that is coupled to the first holder. Rods may be partially or fully threaded. A nut 607 may be threadedly coupled to the rod; the position of the nut 607 relative to the end of the rod may be adjusted, thereby increasing, or decreasing the distance of the rod on which the holder may slide. In the preferred embodiments, the holder may slide along the rod when the holder is disposed on the rod, between the nut 607 and an end of the rod, which preferably is an end that is distal to the nut 607. An upper linking bracket 610*a* may couple a first linking assembly to a lower linking bracket 610*b* of a second linking assembly; see FIGS. 3, 4, and 9. In the preferred embodiments upper linking bracket 610*a* of a first linking assembly (or of any linking assembly) is not directly coupled to a garage door panel hinge pivot axle 117. In the preferred embodiments, a cam-stop assembly may be disposed on the left side of a garage door assembly or on the right side of the garage door, a cam assembly may be disposed on the left side of a garage door assembly or on the right side of the garage door; a linking assembly may be disclosed on the left side of a garage door or on the right side of the garage door.

Combination of Cam-Stop Assemblies

Cam-stop assembly 120 may have a first cam assembly 110 coupled to an elongated stop 130, which may be substantially parallel with the horizontal length of a door panel. A second cam assembly may be similar or equivalent to the first cam assembly provided that the second cam assembly may be coupled to a roller wheel 210 that may be rotationally and operably coupled to a guide rail 800. Standard garage doors, as viewed from someone standing at the main entrance into the garage and facing the garage door, generally have a left side and a right side. The first cam-stop assembly 120 may be disposed along the right of the garage door; the second cam-stop assembly 120 may be disposed along the left of the garage door.

The first cam assembly may be similar or equivalent to the third cam assembly wherein the third cam assembly may have a flange defining a recess couplable with a hook, the fifth cam assembly may have a flange defining a recess couplable with a hook, and the seventh cam assembly may have a flange defining a recess couplable with a hook. The second cam assembly may be similar or equivalent to the fourth cam assembly wherein the fourth cam assembly may have a flange defining a recess couplable with a hook, the sixth cam assembly may have a flange defining a recess couplable with a hook, and the eighth cam assembly may have a flange defining a recess couplable with a hook.

In some embodiments, the first cam assembly 110*a* may be coupled via a linking assembly 600 to a second cam assembly 110*b*; the second cam assembly 110*b* may be coupled via a linking assembly 600 to a fourth cam assembly; the fourth cam assembly may be coupled via a linking assembly 600 to a sixth cam assembly. The compressible connector may be a) a spring, b) a rod, or c) a spring or rod coupled to an upper portion of a connector and a spring or rod coupled on one end to a lower portion of a connector, wherein the spring or rod coupled to the upper portion of the connector may be nonparallel to the spring or rod coupled to the lower portion of the connector, and wherein a spring or rod coupled to a lower portion of a connector may be coupled on an opposite end to a flange bolted to an adjacent cam assembly. Stop brace support may be coupled to a support rod that may extend along part of the height or the entire height of the distance from the highest cam-stop assembly or cam assembly to the ground.

Method of Sealing Garage Doors

Since one or more of the cam assemblies or cam-stop assemblies are fastened to a door panel hinge, then the vertical movement of the garage door panels, actuated by mechanisms known in the art for raising or lowering a garage door, will cause the lowering or raising of the plurality of cam assemblies or plurality of cam-stop assemblies.

Figure 7B:
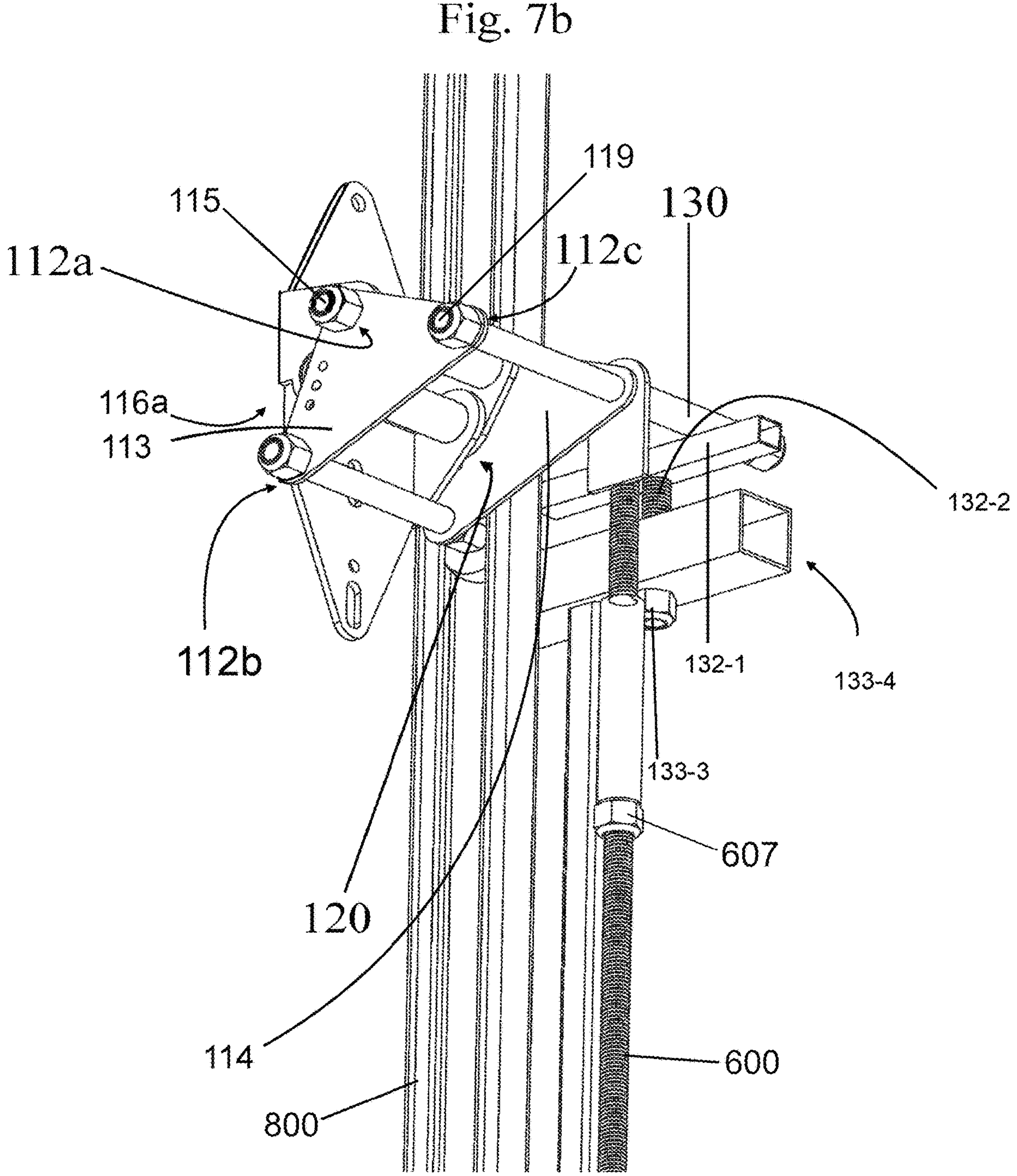
FIG. 7*b*. depicts a side view of a right-side cam-stop assembly in position two at the beginning of when it engages the stop brace.

To seal the garage door, the stop 130 of the cam-stop assembly 120 is first positioned above the stop brace, such as stop brace 132-1. The garage door, and also the cam-stop assembly, is lowered. Referring to FIG. 7*b*, when the stop 130, which in the preferred embodiments would be a stop coupled to a corner 112*c* of a triangular hinge of the cam stop assembly 120 that projects towards the interior portion of the garage space, of the cam-stop assembly comes into contact with the stop brace 132-1, and preferably the other two corners of the cam-stop assembly are substantially parallel, at the beginning, to the main face of the garage door. When the stop 130 of the cam-stop assembly 120 detachably couples with (contacts) the stop brace 132-1, then torque is exerted on the cam-stop assembly such that the other two corners of the cam-stop assembly are rotated counter-clockwise, from the perspective of someone standing next to the center, front of the garage door and facing the first cam-stop assembly (which is aligned on the right side of the garage door), and thereby nudging the door panel hinge and corresponding side of the garage door approximately between one and four inches (in some preferred embodiments), which is lower and more forward than before the stop engaged with the stop brace. The vertical position of the stop brace 132-1 may be lowered or raised; in some embodiments, the stop brace may have a threaded end 132-2, and the rotation of the stop brace 132-1 may raise or lower the distance between the stop brace 132-1 and a stop brace support 133-4, which may be threadedly coupled to the stop brace via a threaded rod 132-2 coupled to a nut 133-3. By nudging the door panel hinge forward and downward, the portions of the garage door may form a snug seal with the side of the door jamb and also the bottom floor. Weather stripping may be installed along the jamb, and the garage door may then be pressed against the weather stripping.

When the garage door is opened by the open-closing mechanism then the cam-stop assembly will also press against the stop brace, but since the garage door is being raised, then the torque and rotation of the cam-stop assembly will result in the upper portion of the cam-stop assembly being rotated towards the ceiling of the garage space, thereby causing the garage door to be moved backwards and upwards, which may have advantageously reduce the incidence of the garage door scraping against the garage 485 door jamb (or weather stripping attached to the door jamb).

The linking assemblies, such as the tensible rod, that may be used to connect a cam stop assembly to one or more lower cam assemblies, may act to stabilize the cam assemblies, and also allow for the cam assemblies to move in conjunction with the cam-stop assembly, such that when the cam-stop assembly is being rotated by the 490 torque created by force generated by the stop against the stop brace, then the other cam assemblies aligned along the same side of the garage door move in conjunction.

Referring to FIG. 3, spring 300 may couple a cam assembly 110, such as cam assembly 110*a*, to a connector 400, thereby stabilizing the cam assembly. The connection of the linking assembly 600 via a tension rod coupled to a rod and bracket at rotational point 500 assists with the stabilization. A brace plate may be used as an adaptor, such as a brace plate having a hole, for coupling a spring to a linking assembly, such as via a holder. The brace plate 113 may be coupled to a cam assembly. The castor wheel may be offset from axle of the adjacent cam assembly or cam-stop assembly.

Figure 7C:
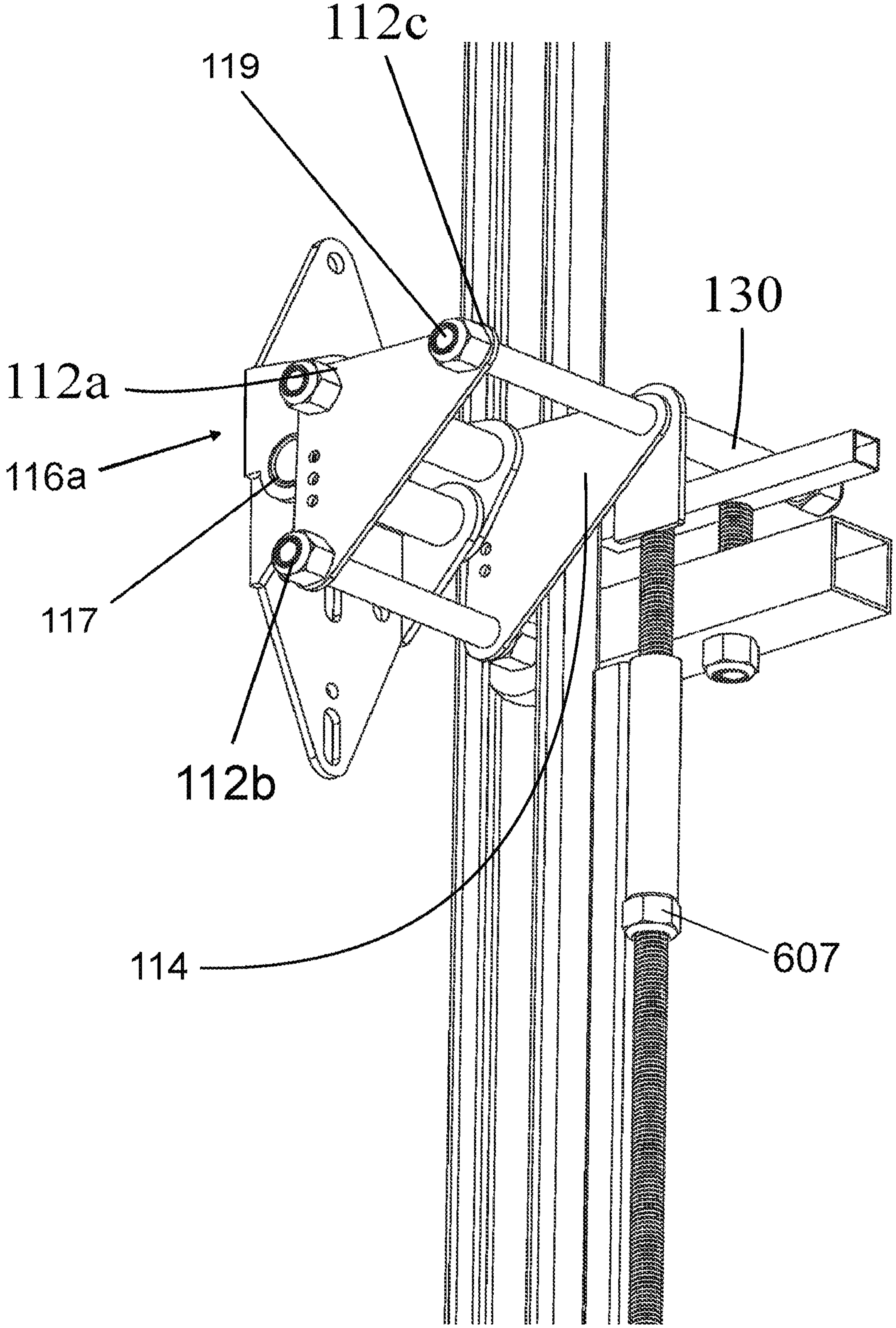
FIG. 7*c*. depicts a side view of a cam-stop assembly in position three in middle of when it engages the stop brace.
Figure 7D:
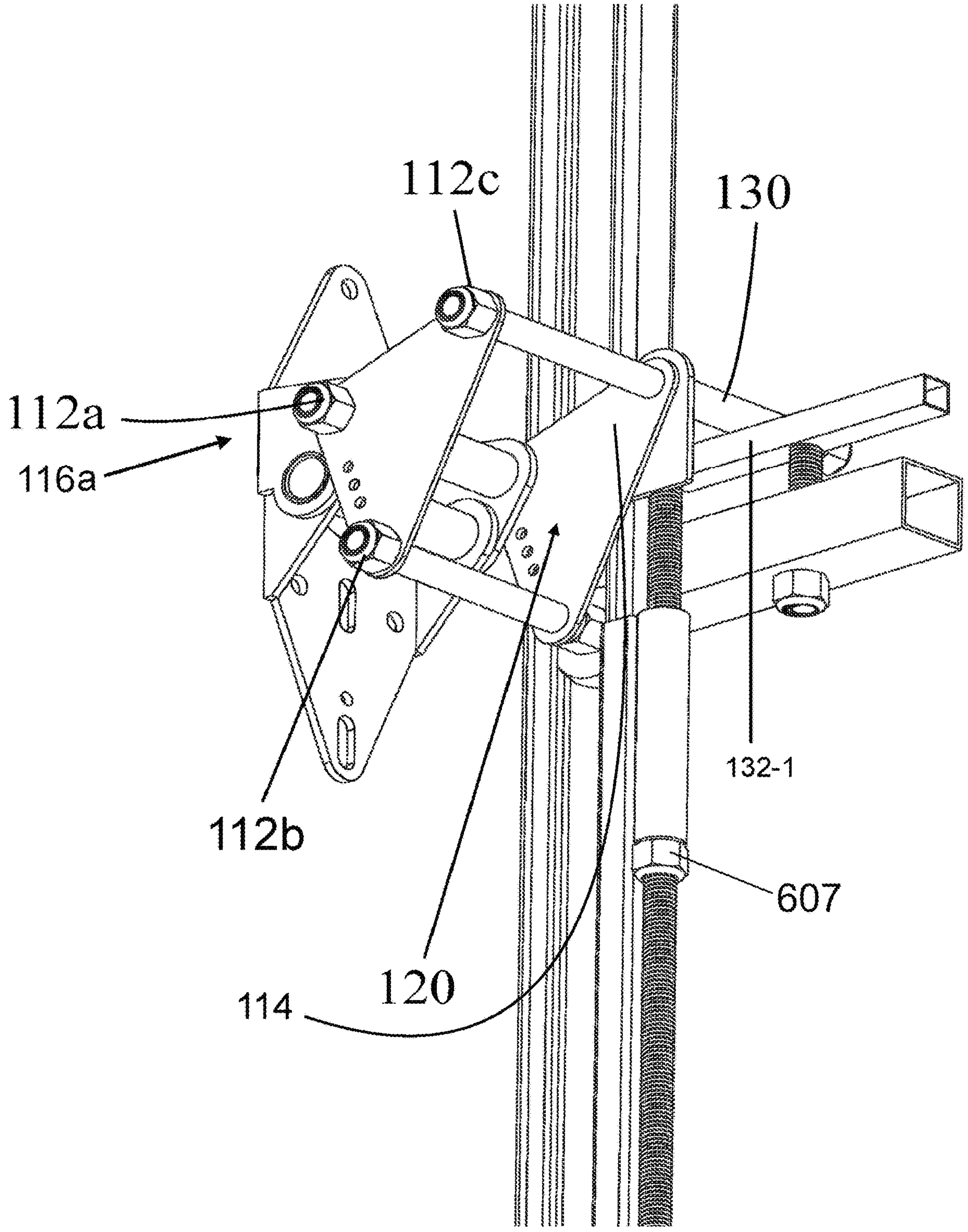
FIG. 7*d*. depicts a side view of a cam-stop assembly in position four where it has fully pushed the door against the door jamb.
Figure 8A:
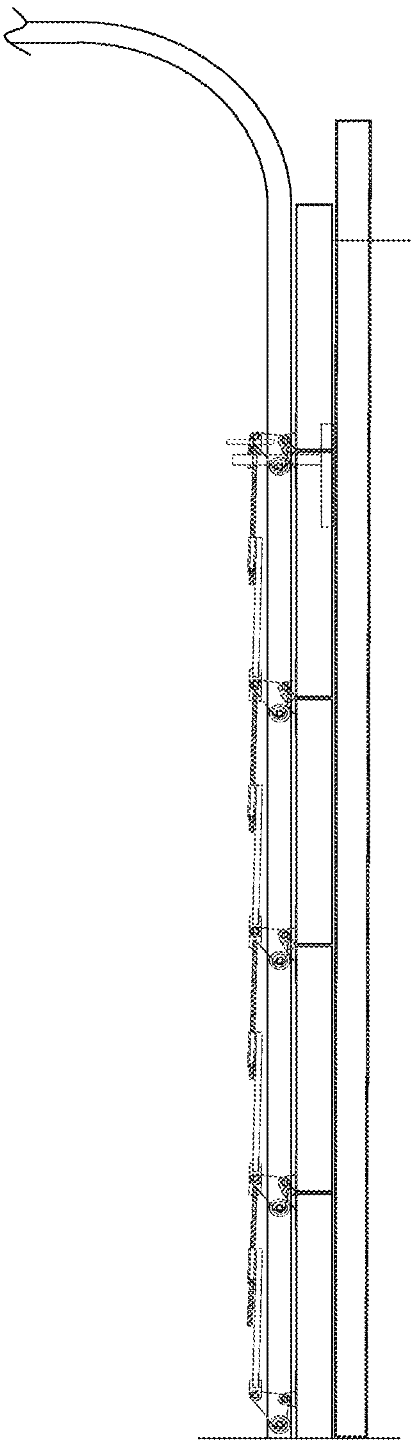
FIG. 8*a*. depicts a side view of a left-side of a sealing assembly in a closed position, the view being taken from the center of the garage looking towards the left guard rail.
Figure 8B:
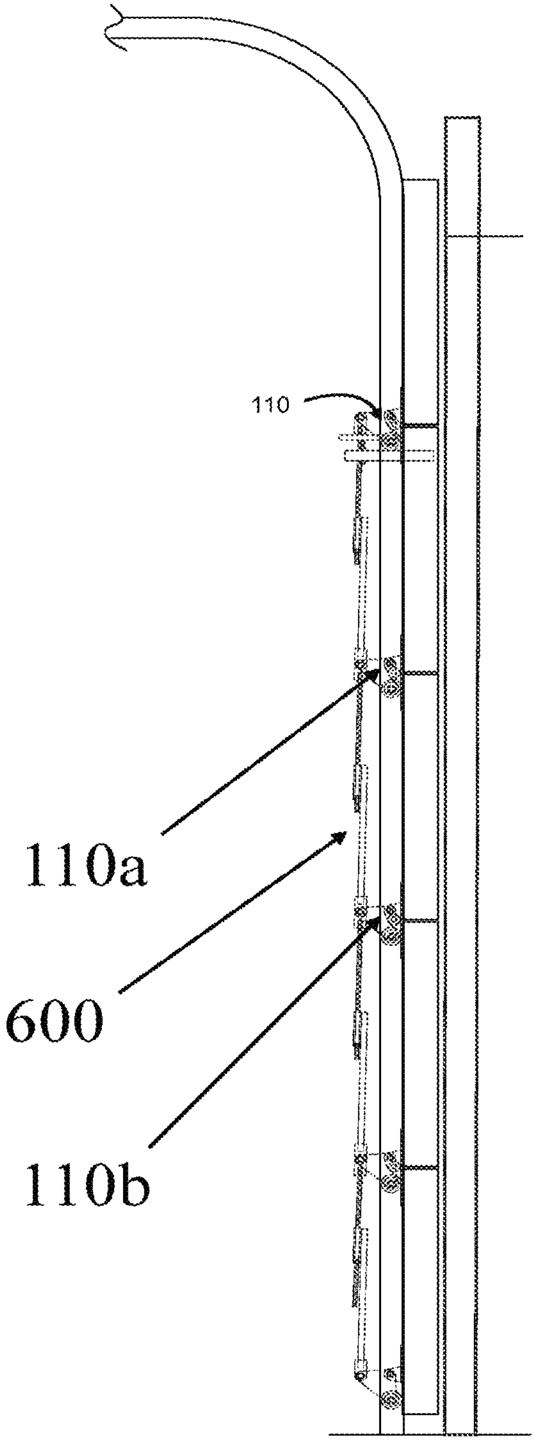
FIG. 8*b*. depicts a side view of a left-side of a sealing assembly in an opened position, the view being taken from the center of the garage looking towards the left guard rail.

Referring to FIG. 7*c*, panel pivot axle 117 may be offset from cam linkage axle 119.

Figure 10:
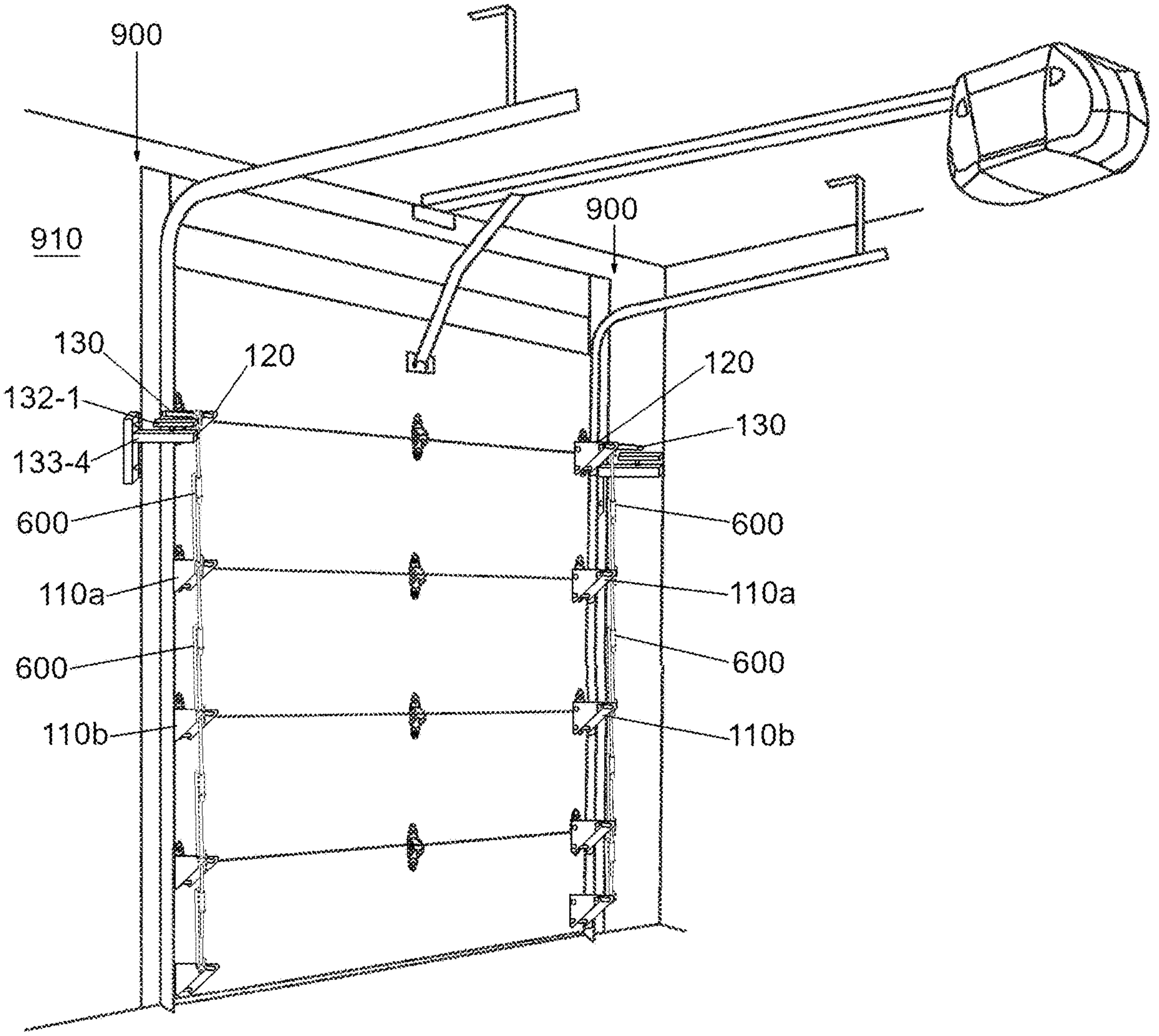
FIG. 10 depicts a schematic of a first right-side cam-stop assembly coupled to a second right-side cam assembly which is coupled to a third right-side cam assembly; as well as a first left-side cam-stop assembly coupled to a second left-side cam assembly which is coupled to a third left-side cam assembly.

Referring to FIG. 10, a schematic is depicted of a first right-side cam-stop assembly 120 coupled to a first right-side cam assembly 110*a* which is coupled to a second right-side cam assembly 110*b*; as well as a first left-side cam-stop assembly 120 coupled to a first left-side cam assembly 110*a* which is coupled to a second left-side cam assembly 110*b*. A first left-side cam-stop assembly 120 comprising a first left-side stop 130 coupled to a first left-side cam assembly 110 is disclosed; a first left-side stop brace 132-1 is coupled to a first left-side stop brace support 133-4, which may be coupled to a wall 910; a first right-side stop 130 is disclosed; a first right-side stop brace 132-1 is coupled to the first right-side stop 130; an exemplary distance between the first right-side stop brace and the first left-side stop brace is shown by the distance between the tips of the arrows labeled 900, 900; a first right-side cam-stop assembly 120 comprising a first right-side stop 130 coupled to a first right-side cam assembly 110 (see also FIG. 7*a* through FIG. 7*d*) is shown; a first right-side door panel hinge 116*a* is disclosed in FIG. 7*a* as well as FIG. 10; a first left-side door panel hinge 116*a* is disclosed (see FIG. 3 and FIG. 10).

The first right-side stop may be an elongated appendage member; the first left-side stop may be an elongated appendage member.

CONCLUSION

Different embodiments and aspects of the apparatus and methods of the sealing assembly are disclosed herein that include a variety of components, features, and functionality. It should be noted that the various embodiments and aspects of the apparatus and methods may include any of the components, features, and functionality of any of the other embodiments and aspects of the apparatus and methods disclosed herein in any combination, and all such possibilities are intended to be within the scope of the present disclosure. Therefore, the enumerated disclosure is not intended to be limiting in any way. A person skilled in the art may come across many modifications of the disclosure set forth herein having the benefit of the teachings presented in the foregoing descriptions and the associated drawings.

What is claimed is:

1. A sealing system comprising:
- at least one guide track;
- a first right-side stop brace;
- a first right-side stop brace support directly coupled to the first right-side stop brace, the first right-side stop brace support being directly coupled to a wall;
- a first left-side stop brace;
- a first left-side stop brace support directly coupled to the first left-side stop brace, the first left-side stop brace support being directly coupled to the wall, wherein a horizontal distance between the first right-side stop brace and the first left-side stop brace is at least five feet;
- a first right-side door panel hinge wherein the first right-side door panel hinge is attached to a first garage door panel;
- a first left-side door panel hinge attached to the first garage door panel;
- a first right-side cam-stop assembly directly coupled to the first right-side door panel hinge, the first right-side cam-stop assembly further comprising:
  - a first right-side stop, the first right-side stop being an elongated appendage member having a longitudinal axis, the first right-side stop being detachably couplable to the first right-side stop brace;
  - a first right-side cam assembly directly coupled to the first right-side stop, the first right-side cam assembly comprising:
    - an at least one cam plate, the at least one cam plate having a main face, wherein the at least one cam plate is rotatable;
    - a first axle having a longitudinal axis which pivotably attaches the first right-side cam assembly to the first right-side door panel hinge;
    - a second axle having a longitudinal axis which attaches a roller wheel to the first right-side cam assembly;
    - a third axle having a longitudinal axis which attaches the first right-side stop to the first right-side cam assembly, wherein the first axle is coupled to the at least one cam plate at a first position on the at least one cam plate, the second axle is coupled to the at least one cam plate at a second position on the at least one cam plate, and the third axle is coupled to the at least one cam plate at a third position on the at least one cam plate, wherein the first position, the second position, and the third position define a triangle on the at least one cam plate;
- a second right-side cam assembly being vertically aligned with the first right-side cam-stop assembly and being spaced apart vertically from the first right-side cam-stop assembly, wherein the second right-side cam assembly is coupled to the first right-side cam-stop assembly via a first right-side linking assembly, wherein the first right-side linking assembly is attached to the first right side cam assembly third axle; and, a first left-side cam-stop assembly disposed on the left side of the first garage door panel, the first left-side cam-stop assembly directly coupled to the first left-side door panel hinge, the first left-side cam-stop assembly further comprising:

a first left-side cam assembly directly coupled to a first left-side stop, the first left-side stop being detachably couplable to the first left-side stop brace; the first left-side cam assembly comprising a first axle having a longitudinal axis which pivotably attaches the first left-side cam assembly to the first left-side door panel hinge, a second axle having a longitudinal axis which attaches a roller wheel to the first left-side cam assembly, a third axle having a longitudinal axis which attaches the first left-side stop to the first left-side cam assembly, and an at least one cam plate of the first left-side cam assembly, wherein the first axle of the first left-side cam assembly, the second axle of the first left-side cam assembly, and the third axle of the first left-side cam assembly are each coupled to the at least one cam plate of the first left-side cam assembly at locations that define a triangle, the at least one cam plate of the first left-side cam assembly having a main face, wherein the at least one cam plate of the first left-side cam assembly is rotatable around the first axle of the first left-side cam assembly;

first left-side door panel hinge, wherein the first left-side door panel hinge is attached to the first garage door panel; and, a second left-side cam assembly, the second left-side cam assembly being coupled to and vertically aligned with the first left-side cam-stop assembly via a first left-side linking assembly.

2. The sealing system of claim 1, wherein, on the at least one cam plate of the first right-side cam assembly, a distance between the third position and the second position is greater than a distance between the third position and the first position, and wherein the distance between the third position and the second position is greater than a distance between the first position and the second position.

3. The sealing system of claim 1, wherein the first right-side linking assembly comprises:

a rod having a major length that is oriented between the first right-side cam assembly and the second right-side cam assembly, a connector and a first holder which receives the first right-side linking assembly rod such that the first right-side rod linking assembly rod is slidably disposed within the holder and is constrained to slide through the holder along the rod major length to thereby vary a length of the first right-side linking assembly.

4. The sealing system of claim 3, wherein the first right-side linking assembly rod is slidable within the first holder to shorten the first right-side linking assembly to a length shorter than a first length, wherein a fastener is attached to the first right-side linking assembly rod, and wherein the fastener contacts the first holder when the first right-side linking assembly is at the first length to prevent the first right-side linking assembly from lengthening past the first length.

5. The sealing system of claim 4, wherein the first right-side linking assembly rod comprises a threaded rod greater than four inches in length, and wherein the fastener comprises a nut threadedly coupled to the threaded rod, wherein the nut selectively prevents elongation of the first right-side linking assembly past the first length.

6. The sealing system of claim 4, wherein a position of the fastener on the first right-side linking assembly rod is adjustable to thereby adjust said first length.

7. The sealing system of claim 1, wherein downward movement of the first right-side cam-stop assembly causes the first right-side stop to contact the first right-side stop brace; thereby rotating the first cam-stop assembly about the first axle and thereby moving the first garage door panel laterally towards an adjacent wall.

8. A sealing system comprising:

a first guide track;

a first garage door panel, wherein the first garage door panel is movable along the first guide track to selectively open or close the first garage door panel;

a first cam-stop assembly attached to the first garage door panel, the first cam-stop assembly comprising:

a first cam-stop body;

a first axle pivotably connecting the first cam-stop assembly to the first garage door panel, the first axle located at a first position on the first cam-stop body;

a second axle connecting a first roller wheel to the first cam-stop assembly at a second position on the first cam-stop body which is separated from the first position, wherein the first roller wheel rides in the first guide track to facilitate movement of the first garage door panel along the first guide track;

a first stop connected to the first cam-stop assembly at a third position on the first cam-stop body which is separated from the first position and the second position, wherein the first position, the second position, and the third position define a triangle on the first cam-stop body when the first cam assembly is viewed from a side of the first door panel:

a stationary stop brace;

wherein, as the first garage door panel moves towards a closed position, the first stop contacts the stop brace, and wherein further movement of the first garage door panel towards the closed position causes rotation of the first cam-stop assembly about the first axle and thereby moves the first garage door panel in a direction generally perpendicular to the first guide track.

9. The sealing system of claim 8, wherein rotation of the first cam-stop assembly moves the first garage door panel away from the first roller wheel and thereby moves the first garage door panel towards an adjacent wall.

10. The sealing system of claim 8, wherein, on the first cam-stop body, a distance between the third position and the second position is greater than a distance between the third position and the first position, and wherein the distance between the third position and the second position is greater than a distance between the first position and the second position.

11. The sealing system of claim 8, wherein the stop brace is attached to a stop brace support, and wherein a position of the stop brace relative to the stop brace support is adjustable to thereby alter the position of the stop brace along the first guide track.

12. The sealing system of claim 8, wherein the first cam-stop assembly is attached to a first garage door hinge, and wherein the first garage door hinge is attached to the first garage door panel.

13. The sealing system of claim 8, further comprising:

a second garage door panel;

a first cam assembly attached to the second garage door panel, the first cam assembly comprising:

a first cam body;

a first axle pivotably connecting the first cam assembly to the second garage door panel, the first axle located at a first position on the first cam body; and a second axle connecting a second roller wheel to the first cam assembly at a second position on the first cam body which is separated from the first position on the first cam body, wherein the second roller wheel rides in the first guide track to facilitate movement of the first garage door panel along the first guide track; and a third axle which is connected to the first cam body at a third position, wherein the third position is separated from the first position on the first cam body and is separated from the second position on the first cam body, wherein the first cam assembly first position, second position, and third position define a triangle on the first cam body when the first cam assembly is viewed from a side of the first door panel;

wherein the system comprises a first linking assembly that extends between the first cam-stop assembly and the first cam assembly, wherein the first linking assembly is attached to the first cam-stop assembly at the third position on the first cam-stop assembly, wherein the first linking assembly is attached to the first cam assembly third axle, and wherein the first linking assembly causes rotation of the first cam assembly about the first cam assembly first axle when the first cam-stop assembly rotates about the first cam-stop assembly first axle.

14. The sealing system of claim 13, wherein the first cam assembly is attached to a second garage door hinge, and wherein the second garage door hinge is attached to the second garage door panel.

15. The sealing system of claim 13, wherein, on the first cam body, a distance between the third position and the second position is greater than a distance between the third position and the first position, and wherein the distance between the third position and the second position is greater than a distance between the first position and the second position.

16. The sealing assembly of claim 13, wherein the first linking assembly comprises a first end attached to the first cam-stop assembly, a second end attached to the first cam assembly, an elongate rod having a major length oriented between the first end and the second end, a holder which slides along the major length of the elongate rod to thereby change a length of the first linking assembly, and a stop attached to the elongate rod that selectively contacts the holder to prevent the first linking assembly from extending past a first length.

17. The sealing assembly of claim 13, wherein the first linking assembly comprises a first end bracket that is attached to the first cam-stop assembly third position and a second end bracket that is attached to the first cam assembly third position.

18. The sealing assembly of claim 13, wherein the first linking assembly comprises a connector with a holder and a rod having a major length that is aligned with a major length of the first linking assembly, wherein the holder constrains the rod to slide through the holder in a direction aligned with the major length of the rod, wherein the rod is slidable within the holder in a first direction aligned with the major length of the rod to shorten the first linking assembly to a length shorter than a first length, wherein the rod is slidable within the holder in a second direction aligned with the major length of the rod to lengthen the first linking assembly to a length which is less than or equal to the first length, wherein a fastener is attached to the rod, and wherein the fastener contacts the holder when the first linking assembly is at the first length to prevent the first linking assembly from lengthening past the first length.

19. The sealing assembly of claim 16, wherein the first linking assembly elongate rod comprises a first length of a threaded rod, and wherein the stop comprises a nut which is threaded coupled to the threaded rod, and wherein the nut contacts the holder to prevent the first linking assembly from lengthening past the first length.

20. A sealing system comprising:

a first guide track;

a first door panel, wherein the first door panel is movable along the first guide track to selectively open or close the first door panel;

a first cam assembly attached to the first door panel, the first cam assembly comprising:

a first cam assembly body;

a first axle pivotably connecting the first cam assembly body to the first door panel, the first axle located at a first position on the first cam assembly body;

a second axle connecting a first roller wheel to the first cam assembly body at a second position on the first cam assembly body which is separated from the first position, wherein the first roller wheel rides in the first guide track to facilitate movement of the first door panel along the first guide track; and an actuator connected to the first cam assembly body at a third position on the first cam assembly body which is separated from the first position and from the second position, wherein the first position, the second position, and the third position define a triangle on the first cam assembly body when the first cam assembly is viewed from a side of the first door panel;

wherein movement of the first door panel towards a closed position causes the actuator to rotate the first cam assembly about the first axle and thereby moves the first door panel relative to the roller wheel and thereby moves the first door panel in a direction generally perpendicular to the first guide track.

21. The sealing system of claim 20, wherein the sealing system further comprises:

a stationary stop brace;

wherein the first cam assembly actuator comprises a first stop arm;

wherein, as the first door panel moves towards the closed position, the first stop arm contacts the stationary stop brace, and wherein further movement towards the closed position causes said rotation of the first cam assembly about the first axle.

22. The sealing system of claim 20, wherein rotation of the first cam assembly moves the first door panel away from the first roller wheel and thereby moves the first door panel in a direction generally perpendicular to the first guide track towards an adjacent wall.

23. The sealing system of claim 20, wherein, on the first cam assembly body, a distance between the third position and the second position is greater than a distance between the third position and the first position, and wherein the distance between the third position and the second position is greater than a distance between the first position and the second position.

24. The sealing system of claim 20, further comprising:

a second cam assembly, the second cam assembly comprising:

a second cam assembly body;

a first axle pivotably connecting the second cam assembly body to the first door panel, the first axle of the second cam assembly located at a first position on the second cam assembly body; and a second axle connecting a second roller wheel to the second cam assembly body at a second position on the second cam assembly body which is separated from the first position on the second cam assembly, wherein the second roller wheel rides in the first guide track to facilitate movement of the first door panel along the first guide track; and a third axle connected to the second cam assembly body at a third position which is separated from the first position on the second cam assembly body and the second position on the second cam assembly body, wherein the second cam assembly first position, second position, and third position define a triangle on the second cam assembly body when the second cam assembly is viewed from a side of the first door panel;

wherein the system comprises a first linking assembly that extends between the first cam assembly and the second cam assembly, wherein the first linking assembly is attached to the first cam assembly at the third position on the first cam assembly, wherein the first linking assembly is attached to the second cam assembly at the third axle on the second cam assembly, and wherein the first linking assembly causes rotation of the second cam assembly about the second cam assembly first axle when the first cam assembly rotates about the first cam assembly first axle.

25. The sealing system of claim 24, further comprising a second door panel, wherein the second cam assembly is attached to a second door hinge, and wherein the second door hinge is attached to the first door panel and the second door panel.

26. The sealing system of claim 24, wherein, on the second cam assembly body, a distance between the third position and the second position is greater than a distance between the third position and the first position, and wherein the distance between the third position and the second position is greater than a distance between the first position and the second position.

27. The sealing assembly of claim 24, wherein the first linking assembly comprises a first end attached to the first cam assembly, a second end attached to the second cam assembly, an elongate rod having a major length oriented between the first end and the second end, a holder which slides along the major length of the elongate rod to thereby change a length of the first linking assembly, and a stop attached to the elongate rod that selectively contacts the holder to prevent the first linking assembly from extending past a first length.

28. The sealing assembly of claim 24, wherein the first linking assembly comprises a connector with a holder and a rod having a major length that is generally parallel to a major length of the first linking assembly, wherein the holder constrains the rod to slide through the holder in a direction aligned with the major length of the rod, wherein the rod is slidable within the holder in a first direction aligned with the major length of the rod to shorten the first linking assembly to a length shorter than a first length, wherein the rod is slidable within the holder in a second direction aligned with the major length of the rod to lengthen the first linking assembly to a length which is less than or equal to the first length, wherein a fastener is attached to the rod, and wherein the fastener contacts the holder when the first linking assembly is at the first length to prevent the linking assembly from extending past the first length.

29. The sealing assembly of claim 26, wherein the first linking assembly comprises a length of a threaded rod, and wherein the fastener comprises a nut which is threaded coupled to the threaded rod, and wherein the nut contacts the holder to prevent the linking assembly from lengthening past the first length.

* * * * *